United States Patent
Shen et al.

(10) Patent No.: US 10,977,758 B2
(45) Date of Patent: Apr. 13, 2021

(54) TRAFFIC SECTION FEE PAYMENT METHOD, FEE SYSTEM, AND PAYMENT SYSTEM

(71) Applicant: Advanced New Technologies Co., Ltd., George Town (KY)

(72) Inventors: Lingnan Shen, Hangzhou (CN); Ge Chen, Hangzhou (CN); Jie Qi, Hangzhou (CN); Huifeng Jin, Hangzhou (CN); Xuefu Song, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/563,294

(22) Filed: Sep. 6, 2019

(65) Prior Publication Data

US 2019/0392544 A1 Dec. 26, 2019

Related U.S. Application Data

(63) Continuation of application No. PCT/CN2018/078662, filed on Mar. 12, 2018.

(30) Foreign Application Priority Data

Mar. 13, 2017 (CN) .......................... 201710146575.8

(51) Int. Cl.
*G06Q 50/30* (2012.01)
*G06Q 20/32* (2012.01)
(Continued)

(52) U.S. Cl.
CPC .......... *G06Q 50/30* (2013.01); *G06Q 20/322* (2013.01); *G06Q 20/40* (2013.01);
(Continued)

(58) Field of Classification Search
CPC .... G06Q 50/30; G06Q 20/332; G06Q 20/322; G06Q 20/40; G06Q 20/20;
(Continued)

(56) References Cited

U.S. PATENT DOCUMENTS

2009/0032587 A1 2/2009 Takanashi
2012/0278137 A1* 11/2012 Dixon .................. G06Q 20/322
705/13
(Continued)

FOREIGN PATENT DOCUMENTS

CN 105374071 3/2016
CN 105374071 A * 3/2016
(Continued)

OTHER PUBLICATIONS

Finzgar et al., "Use of NFC or QR code Identification in Electronic Ticket System for Public Transport", Nov. 1, 2011, IEEE SoftCOM 2011, 19th International Conference on Software, Telecommunications and Computer Networks (Year: 2011).*
(Continued)

*Primary Examiner* — Rupangini Singh
(74) *Attorney, Agent, or Firm* — Fish & Richardson P.C.

(57) ABSTRACT

A client device obtains and records inbound station information. The client device sends first electronic credential information to an inbound charging apparatus, where the first electronic credential information comprises authentication information generated by a payment system based on a user identity in the client device. The client device sends second electronic credential information and the inbound station information to an outbound charging apparatus, where the second electronic credential information comprises authentication information generated by the payment system based on the user identity in the client device.

21 Claims, 11 Drawing Sheets

(51) Int. Cl.
*G06Q 20/40* (2012.01)
*H04L 29/06* (2006.01)
*G06K 7/14* (2006.01)
*G06Q 20/20* (2012.01)

(52) U.S. Cl.
CPC ........ *H04L 63/0876* (2013.01); *G06K 7/1413* (2013.01); *G06K 7/1417* (2013.01); *G06Q 20/20* (2013.01); *G06Q 20/3278* (2013.01)

(58) Field of Classification Search
CPC ............ G06Q 20/3278; H04L 63/0876; G06K 7/1413; G06K 7/1417
See application file for complete search history.

(56) References Cited

U.S. PATENT DOCUMENTS

| | | | | |
|---|---|---|---|---|
| 2012/0296710 | A1* | 11/2012 | Dixon | G06Q 20/027 705/13 |
| 2013/0030964 | A1 | 1/2013 | Nuzzi et al. | |
| 2014/0337138 | A1* | 11/2014 | Chitalia | G06Q 20/20 705/14.64 |
| 2015/0371228 | A1* | 12/2015 | Kershaw | G06Q 20/3274 705/77 |
| 2017/0358148 | A1* | 12/2017 | Kayhani | G06Q 20/3224 |

FOREIGN PATENT DOCUMENTS

| | | | |
|---|---|---|---|
| CN | 105405170 | 3/2016 | |
| CN | 105787722 | 7/2016 | |
| CN | 106447328 | 2/2017 | |
| CN | 206003163 | 3/2017 | |
| CN | 107038562 | 8/2017 | |
| CN | 107609859 | 1/2018 | |
| JP | 2015204114 | 11/2015 | |
| KR | 100968071 | 7/2010 | |
| TW | 201123044 | 7/2011 | |
| WO | WO-02073546 A2 * | 9/2002 | ............ G07B 15/02 |
| WO | WO 2017027369 | 2/2017 | |

OTHER PUBLICATIONS

Crosby et al., "BlockChain Technology: Beyond Bitcoin," Sutardja Center for Entrepreneurship & Technology Technical Report, Oct. 16, 2015, 35 pages.
Extended European Search Report in European Application No. 18768339.6, dated Aug. 26, 2019, 8 pages.
Nakamoto, "Bitcoin: A Peer-to-Peer Electronic Cash System," www.bitcoin.org, 2005, 9 pages.
PCT International Search Report and Written Opinion in International Application No. PCT/CN2018/078662, dated May 30, 2018, 15 pages (with English translation).
PCT International Preliminary Report on Patentability in International Application No. PCT/CN2018/078662, dated Sep. 17, 2019, 10 pages (with English translation).

* cited by examiner

TRAFFIC SECTION FEE PAYMENT METHOD, FEE SYSTEM, AND PAYMENT SYSTEM

CROSS-REFERENCE TO RELATED APPLICATIONS

This application is a continuation of PCT Application No. PCT/CN2018/078662, filed on Mar. 12, 2018, which claims priority to Chinese Patent Application No. 201710146575.8, filed on Mar. 13, 2017, and each application is hereby incorporated by reference in its entirety.

TECHNICAL FIELD

The present application relates to the field of computer software technologies, and in particular, to a traffic section fee payment method, a fee system, and a payment system.

BACKGROUND

In existing section fee buses or subways, payment methods of the buses or subways are usually as follows: swiping a bus card, buying a one-time ticket card, etc. In this solution, a passenger swipes a card when getting on a bus (getting in a station) and swipes the card again when getting off the bus (getting out of a station). A POS machine compares information obtained through reading the card two times to determine a bus fare of the passenger this time and deduct money.

At present, some mobile phone manufacturers integrate an SE chip into a mobile phone, and a bus card function can be activated in the SE chip of the mobile phone, so that users can use the mobile phone as a bus card. However, such a method needs to rely on the mobile phone to support the SE chip, and the SE chip of the mobile phone needs to be compatible with POS machines in buses or subways.

How to implement convenient payment for traffic section fees based on an existing mobile device is the technical problem to be alleviated in the present application.

SUMMARY

An objective of implementations of the present application is to provide a traffic section fee payment method, a fee system, and a payment system, so that public traffic section fees can be conveniently charged based on an existing mobile device.

To alleviate the previous technical problem, the implementations of the present application are implemented as follows:

According to a first aspect, a traffic section fee payment method is provided, and includes the following: obtaining, by an inbound charging apparatus, first electronic credential information of a client device, where the first electronic credential information is authentication information generated by a payment system based on a user identity in the client device; sending, by the inbound charging apparatus, inbound information to the payment system, where the inbound information includes inbound station information and the first electronic credential information; obtaining, by an outbound charging apparatus, second electronic credential information of the client device, where the second electronic credential information is authentication information generated by the payment system based on the user identity in the client device; and sending, by the outbound charging apparatus, outbound information to the payment system, where the outbound information includes outbound station information and the second electronic credential information, where the outbound information and the inbound information are used by the payment system to determine a payment account that corresponds to the user identity in the client device and pay a traffic fee.

According to a second aspect, a traffic section fee payment method is provided, and includes the following: receiving inbound information sent by an inbound charging apparatus, where the inbound information includes inbound station information and first electronic credential information, and the first electronic credential information is authentication information generated by a payment system based on a user identity in a client device; receiving outbound information sent by an outbound charging apparatus, where the outbound information includes outbound station information and second electronic credential information, and the second electronic credential information is authentication information generated by the payment system based on the user identity in the client device; verifying validity of the first electronic credential information and validity of the second electronic credential information; and paying a traffic fee by using a payment account that corresponds to the user identity based on the inbound station information and the outbound station information when verifying that both the first electronic credential information and the second electronic credential information are valid.

According to a third aspect, a traffic section fee payment method is provided, and includes the following: sending, by a client device, first electronic credential information to an inbound charging apparatus, where the first electronic credential information is authentication information generated by a payment system based on a user identity in the client device; and sending, by the client device, second electronic credential information to an outbound charging apparatus, where the second electronic credential information is authentication information generated by the payment system based on the user identity in the client device.

According to a fourth aspect, a traffic section fee payment method is provided, and includes the following: obtaining, by an outbound charging apparatus, second electronic credential information of a client device and inbound station information recorded by the client device, where the second electronic credential information is authentication information generated by a payment system based on a user identity in the client device; and sending, by the outbound charging apparatus, outbound information to the payment system, where the outbound information includes outbound station information, the inbound station information, and the second electronic credential information, where the outbound information is used by the payment system to determine a payment account that corresponds to the user identity in the client device and pay a traffic fee.

According to a fifth aspect, a fee system is provided, and includes an inbound charging apparatus and an outbound charging apparatus, where the inbound charging apparatus is configured to obtain first electronic credential information of a client device, where the first electronic credential information is authentication information generated by a payment system based on a user identity in the client device; the inbound charging apparatus is configured to send inbound information to the payment system, where the inbound information includes inbound station information and the first electronic credential information; the outbound charging apparatus is configured to obtain second electronic credential information of the client device, where the second electronic credential information is authentication information generated by the payment system based on the user identity in the client device; and the outbound charging apparatus is configured to send outbound information to the payment system, where the outbound information includes outbound station information and the second electronic credential information, where the outbound information and the inbound information are used by the payment system to determine a payment account that corresponds to the user identity in the client device and pay a traffic fee.

According to a sixth aspect, a payment system is provided, and includes the following: a receiving unit, configured to receive inbound information sent by an inbound charging apparatus, where the inbound information includes inbound station information and first electronic credential information, and the first electronic credential information is authentication information generated by the payment system based on a user identity in a client device, where the receiving unit is further configured to receive outbound information sent by an outbound charging apparatus, where the outbound information includes outbound station information and second electronic credential information, and the second electronic credential information is authentication information generated by the payment system based on the user identity in the client device; a verification unit, configured to verify validity of the first electronic credential information and validity of the second electronic credential information; and a payment unit, configured to pay a traffic fee by using a payment account that corresponds to the user identity based on the inbound station information and the outbound station information, when the verification unit verifies that both the first electronic credential information and the second electronic credential information are valid.

According to a seventh aspect, a fee system is provided, and includes an outbound charging apparatus, where the outbound charging apparatus is configured to obtain second electronic credential information of a client device and inbound station information recorded by the client device, where the second electronic credential information is authentication information generated by a payment system based on a user identity in the client device; and the outbound charging apparatus is configured to send outbound information to the payment system, where the outbound information includes outbound station information, the inbound station information, and the second electronic credential information, where the outbound information is used by the payment system to determine a payment account that corresponds to the user identity in the client device and pay a traffic fee.

It can be seen from the technical solutions provided in the previous implementations of the present application that, in the implementations of the present application, a charging apparatus obtains an electronic credential of a client device, and sends inbound/outbound information to a payment system based on the electronic credential and station information, so that the payment system can pay a traffic fee of a user based on the inbound/outbound information, thereby improving the payment convenience.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
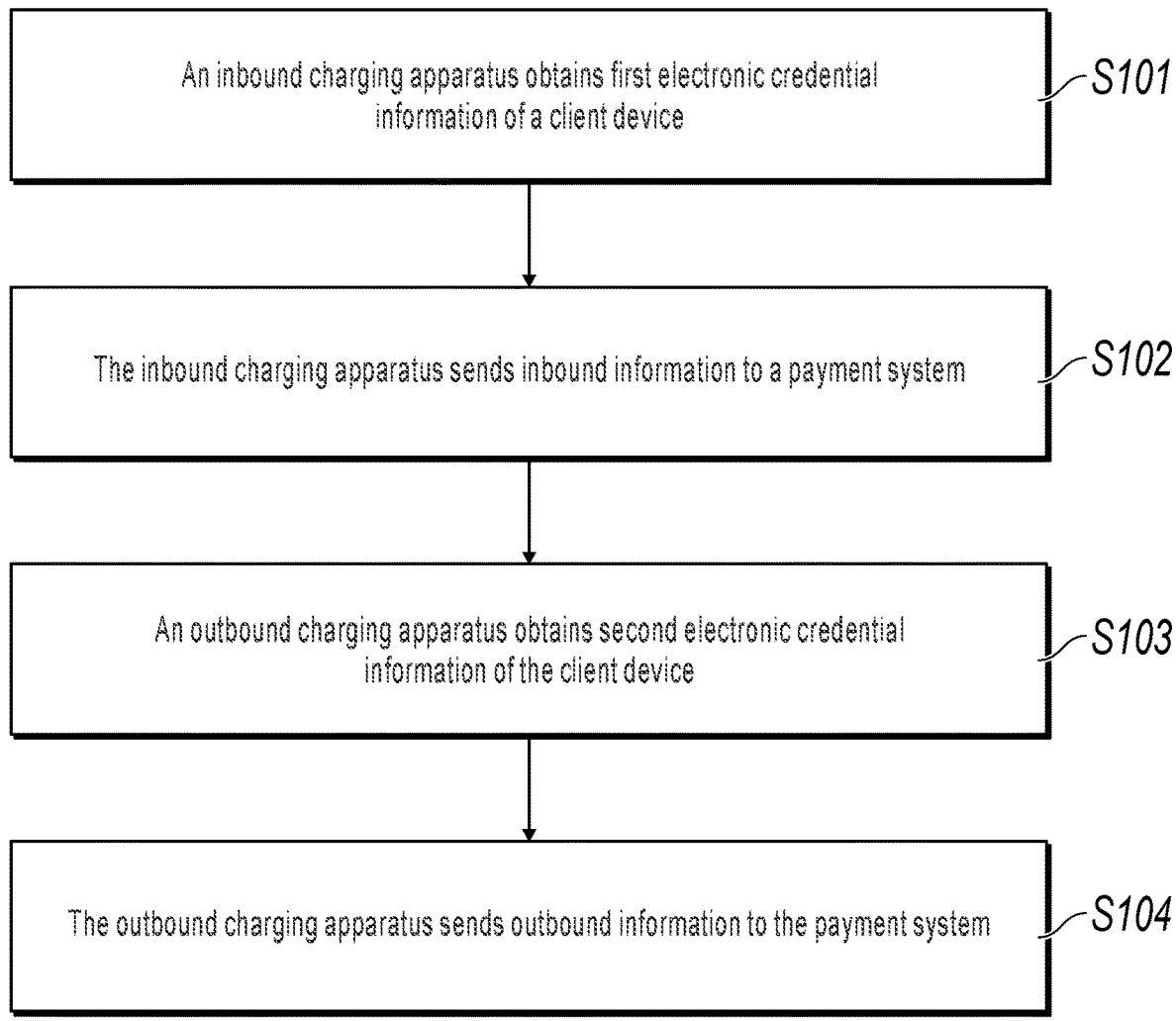
FIG. 1 is a flowchart illustrating a traffic section fee payment method, according to an implementation of the present application.

FIG. 1 is a flowchart illustrating a traffic section fee payment method, according to an implementation of the present application. The method in FIG. 1 is performed by a fee system. The fee system can include an inbound charging apparatus and an outbound charging apparatus. In applications, a charging apparatus can be a device that can perform near field communication, or can be a device that can scan and recognize a barcode, etc. Implementations are not limited in the present implementation of the present application. The method in FIG. 1 can include the following steps.

S101. The inbound charging apparatus obtains first electronic credential information of a client device.

The first electronic credential information is authentication information generated by a payment system based on a user identity in the client device.

It should be understood that in the present implementation of the present application, the first electronic credential information can be a random code randomly generated by the payment system for a user, or can be other verification information allocated by the payment system to a user based on a security authentication mechanism of the payment system with reference to the user identity. Implementations are not limited in the present implementation of the present application. The user identity can be, for example, an identity card number, a phone number, or an email address. It should be understood that the payment system can authenticate the client device based on the first electronic credential information, and the payment system can determine an account number that corresponds to the user identity in the client device by using the first electronic credential information.

It should be understood that in the present implementation of the present application, the client device is a client device used by the user to make payment, for example, a mobile device. More specifically, for example, the client device can be an APP installed on the mobile device. The APP can request the payment system to generate an electronic credential that includes the user identity and verification information, and the payment system can recognize the user identity based on the electronic credential and verify validity of the electronic credential. It should be understood that the APP can be an APP specially developed for public traffic payment or a client-device APP for third-party payment. Implementations are not limited in the present implementation of the present application.

It should be understood that the inbound charging apparatus can obtain the first electronic credential information through near field communication (NFC), by scanning a barcode, etc. The scanning a barcode can be scanning a one-dimensional code, a two-dimensional code, etc.

S102. The inbound charging apparatus sends inbound information to a payment system.

The inbound information includes inbound station information and the first electronic credential information.

After obtaining the first electronic credential information of the client device, the inbound charging apparatus can send the inbound information that includes the inbound station information and the first electronic credential information to the payment system, so that the payment system pays a traffic fee by using the account that corresponds to the user identity in the client device in combination with outbound information.

S103. The outbound charging apparatus obtains second electronic credential information of the client device.

The second electronic credential information is authentication information generated by the payment system based on the user identity in the client device.

A method used by the outbound charging apparatus to obtain the second electronic credential information can be similar to a method used by the inbound charging apparatus.

S104. The outbound charging apparatus sends outbound information to the payment system.

The outbound information includes outbound station information and the second electronic credential information.

The outbound information and the inbound information are used by the payment system to determine a payment account that corresponds to the user identity in the client device and pay a traffic fee.

In the present implementation of the present application, the inbound charging apparatus and the outbound charging apparatus obtain the electronic credentials of the client device, and send the inbound and outbound information to the payment system based on the electronic credentials and the station information, so that the payment system can determine the payment account and pay the traffic fee based on the inbound and outbound information, thereby improving the payment convenience.

Optionally, before step S102, the method further includes the following: The inbound charging apparatus verifies validity of the first electronic credential information.

Step S102 is implemented as follows: The inbound charging apparatus sends the inbound information to the payment system when the inbound charging apparatus verifies that the first electronic credential information is valid.

Before step S104, the method further includes the following: The outbound charging apparatus verifies validity of the second electronic credential information.

Step S104 is implemented as follows: The outbound charging apparatus sends the outbound information to the payment system when the outbound charging apparatus verifies that the second electronic credential information is valid.

In the present implementation of the present application, the charging apparatus can verify the validity of the electronic credential by using a security algorithm, etc., to prevent a user from forging the electronic credential to a certain extent.

Optionally, the first electronic credential information and the second electronic credential information can be the same or different.

The client device of the user can use the same electronic credential information to complete inbound and outbound verification and charging. As such, the user only needs to request the electronic credential information from the payment system once in one process of getting in and out of a station.

Certainly, there is certain risk to payment security in this method. To avoid the theft of an electronic credential, the user usually uses different electronic credentials when getting in and out of a station.

Further, the second electronic credential information includes an inbound identifier. The inbound identifier indicates that the client device has registered with the inbound charging apparatus, and the inbound identifier is used to verify the validity of the second electronic credential information.

To avoid a case that the payment system fails to obtain complete inbound and outbound information because the user uses an electronic credential of an account when getting in a station but uses an electronic credential of another account when getting out of a station, or because the user evades paying a fare when getting in a station, the payment system can add an inbound identifier to the second electronic credential used for getting out of a station, where the inbound identifier is used to indicate that the user has gotten in a station. The inbound identifier can be a flag bit or an inbound station identifier such as a name or a number of an inbound station. Implementations are not limited in the present implementation of the present application.

In this case, the outbound charging apparatus can determine, based on the inbound identifier in the second electronic credential, whether the user uses a user identity that corresponds to the second electronic credential to get in a station, to verify validity of the second electronic credential.

According to the method in the present implementation of the present application, the user can be prevented from directly getting out of a station without inbound verification.

Optionally, the first electronic credential information further includes a first timestamp, used to verify the validity of the first electronic credential. The second electronic credential information further includes a second timestamp, used to verify the validity of the second electronic credential.

It should be understood that a timestamp of an electronic credential can include a credential validity start time, or can include a credential validity start time and a credential validity period, or can include a credential validity start time and a credential validity end time.

In the present implementation of the present application, the timestamp can be added to the electronic credential information, so that the charging apparatus can determine a valid time of the electronic credential, to avoid the theft of the electronic credential to a certain extent.

Optionally, the inbound charging apparatus obtains the first electronic credential information by using first barcode information displayed by the client device, where the first barcode information includes the first electronic credential information. The outbound charging apparatus obtains the second electronic credential information by using second barcode information displayed by the client device, where the second barcode information includes the second electronic credential information.

In the present implementation of the present application, the charging apparatus can obtain an electronic credential by using barcode information. The barcode information can be one-dimensional code information or two-dimensional code information.

Further, the first barcode information includes the inbound station information, used to verify validity of the first barcode information, and/or the second barcode information further includes the outbound station information, used to verify validity of the second barcode information.

In the present implementation of the present application, barcode information of inbound and outbound stations includes information about the corresponding stations, so that the theft of an electronic credential can be avoided to a certain extent.

Optionally, the inbound charging apparatus and the outbound charging apparatus are the same apparatus.

It should be understood that public traffic section fee vehicles can include subways, buses, etc. Particularly, the inbound charging apparatus and the outbound charging apparatus can be the same apparatus when the charging apparatus is a charging apparatus on a bus.

Optionally, the inbound information further includes an inbound timestamp, and the outbound information further includes an outbound timestamp.

In the present implementation of the present application, the timestamps can be added to the inbound and outbound information, so that the payment system can determine whether the user is timed out based on the inbound and outbound timestamps, and determine a timeout deduction amount and deduct money when the user is timed out.

Optionally, when obtaining the first electronic credential a plurality of times, the inbound charging apparatus sends the inbound information to the payment system only once. When obtaining the second electronic credential a plurality of times, the outbound charging apparatus sends the outbound information to the payment system only once.

In the present implementation of the present application, when obtaining the same electronic credential a plurality of times, the charging apparatus generates only one piece of inbound/outbound information, so that the client device can be prevented from being repeatedly charged. Certainly, it should be understood that one electronic credential can be restricted to opening an inbound/outbound channel only once, to prevent the user from using one electronic credential to enable a plurality of persons to get in/out of a station.

The method in the present implementation of the present application is further described below with reference to specific implementations.

Figure 2:
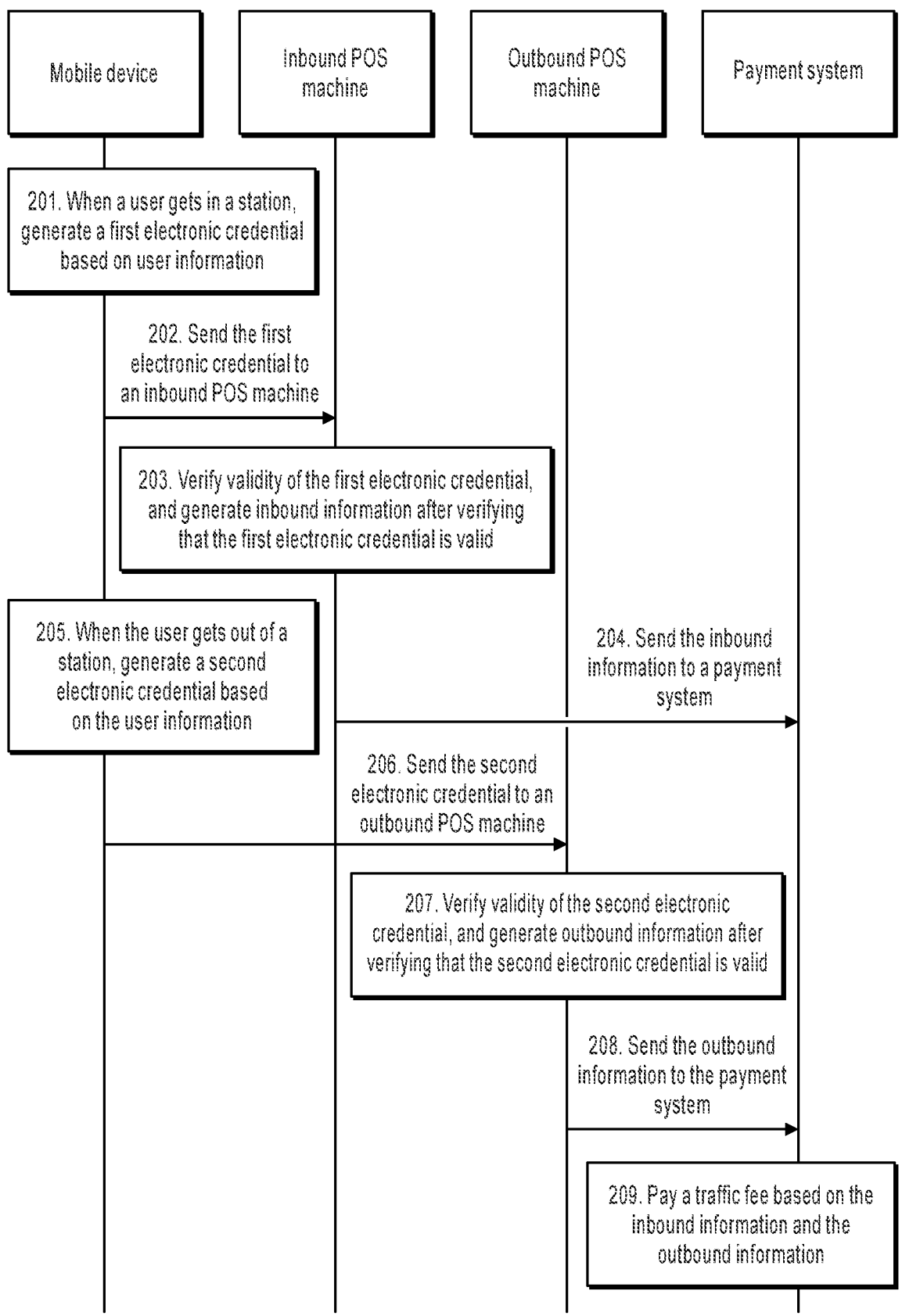
FIG. 2 is a sequence flowchart illustrating a traffic section fee payment method, according to an implementation of the present application.

FIG. 2 is a sequence flowchart illustrating a traffic section fee payment method, according to an implementation of the present application. In the present implementation of the present application, a mobile device is the client device in the implementation shown in FIG. 1, or the mobile device has a function of the client device in the implementation shown in FIG. 1. An inbound POS machine and an outbound POS machine are respectively the inbound charging apparatus and the outbound charging apparatus in the implementation shown in FIG. 1. A payment system is the payment system in the implementation shown in FIG. 1.

It should be understood that in the present implementation of the present application, the mobile device can be a smartphone, a tablet computer, or another device; and an APP on the mobile device can be a client device of the payment system or a client device that can request electronic credential information from the payment system. Implementations are not limited in the present implementation of the present application.

201. When a user gets in a station, the mobile device generates a first electronic credential based on user information.

It should be understood that in the present implementation of the present application, the user information can be user identity information, such as a phone number, an identity card number, or an email account number. A payment system can determine an account number of the user in the payment system based on the user information.

It should be understood that in the present implementation of the present application, the mobile device requests an electronic credential from the payment system based on the user information, where the electronic credential is authentication information generated by the payment system based on the user information in the client device. The payment system can verify validity of the electronic credential, and determine a user identity or a payment account number that corresponds to the electronic credential.

Optionally, for example, the electronic credential can be a random code randomly allocated by the payment system based on the user information, and the payment system can verify and determine an account that corresponds to the user in the payment system based on the random code.

Optionally, the electronic credential can include user identity information, etc. The payment system can determine an account that corresponds to the user in the payment system based on the user identity information.

Certainly, it should be understood that in the present implementation of the present application, the electronic credential information can further include other security verification information, such as a user signature key configured by the payment system for the mobile device. For another example, the electronic credential information can further include a timestamp at which the payment system issues the electronic credential information. For another example, signature information generated by the payment system based on the user identity information can be included.

It should be understood that a timestamp of an electronic credential can include a credential validity start time, or can include a credential validity start time and a credential validity period, or can include a credential validity start time and a credential validity end time.

202. The mobile device sends the first electronic credential to the inbound POS machine.

The mobile device can send the first electronic credential to the inbound POS machine by using a plurality of methods. It should be understood that the sending method in the present implementation of the present application includes transmission in a communication mode, or includes transmission in a barcode displaying method.

For example, the first electronic credential can be sent to the inbound POS machine by using a communication module such as NFC, Bluetooth, or Wi-Fi built in the mobile device, or the first electronic credential can be sent to the inbound POS machine by using barcode information such as a one-dimensional code or a two-dimensional code. A two-dimensional code is used as an example for description below.

After receiving the electronic credential information, the mobile device can generate an inbound two-dimensional code based on the electronic credential information.

Optionally, when the inbound two-dimensional code is generated, an inbound timestamp can be further added to the inbound two-dimensional code, to avoid the theft of the inbound two-dimensional code.

After generating the two-dimensional code information, the mobile device can show the two-dimensional code to the inbound POS machine. The POS machine can use a two-dimensional code scanning apparatus such as a camera to obtain the inbound two-dimensional code information displayed by the mobile device.

203. The inbound POS machine verifies validity of the first electronic credential, and generates inbound information after verifying that the first electronic credential is valid.

The inbound POS machine can verify the validity of the first electronic credential according to a verification rule predetermined with the payment system.

When the client device sends the first electronic credential to the inbound POS machine by using a two-dimensional code, the inbound POS machine verifies validity of the two-dimensional code.

In an implementation, if the information in the first electronic credential satisfies the verification rule predetermined by the payment system and the POS machine, the inbound POS machine can consider that the inbound two-dimensional code is valid. The predetermined verification rule can be periodically requested by the inbound POS machine from the payment system, or can be periodically sent by the payment system to the inbound POS machine, or can be determined by the inbound POS machine and the payment system in another method. Implementations are not limited in the present implementation of the present application. The verification rule can be implemented as a security algorithm, etc. In another implementation, the inbound POS machine can send the first electronic credential information to the payment system for verification, and determine the validity of the inbound two-dimensional code based on a verification result fed back by the payment system.

Certainly, in addition to verifying the electronic credential, the inbound POS machine can verify other information in the inbound two-dimensional code. For example, the inbound POS machine can further consider that the inbound two-dimensional code is invalid based on the inbound timestamp in the inbound two-dimensional code when a time of the inbound timestamp is outside a predetermined time range. For example, if the inbound timestamp is a yesterday's date, it is verified that the inbound two-dimensional code is invalid. For another example, the predetermined time is 1 minute. In this case, if the inbound timestamp is 10 minutes ago, it is verified that the inbound two-dimensional code is invalid.

Certainly, it should be understood that, when the inbound two-dimensional code needs to be verified by using a plurality of items such as the electronic credential and the inbound timestamp, it is verified that the inbound two-dimensional code is invalid if one or more items are invalid. The inbound two-dimensional code is considered valid only when all verification items are verified.

The inbound POS machine can generate the inbound information after verifying that the inbound two-dimensional code is valid. The inbound information can include the electronic credential information and information about an inbound station that the inbound POS machine belongs to. Certainly, it should be understood that the inbound information can further include charging timestamp information. The charging timestamp information can be a time when the inbound POS machine scans and obtains the inbound two-dimensional code, or an inbound timestamp at which the mobile device generates the inbound two-dimensional code, etc.

204. The inbound POS machine sends the inbound information to the payment system.

After generating the inbound information, the inbound POS machine can send the inbound information to the payment system, and open an inbound/outbound channel that corresponds to the inbound POS machine to allow the user of the mobile device to get in a station.

It should be understood that if the inbound POS machine receives information about the same inbound two-dimensional code a plurality of times, the inbound POS machine can send the inbound information to the payment system only once. In addition, the inbound/outbound channel can be activated only once to avoid evading paying a fare by scanning one inbound two-dimensional code.

Certainly, it should be understood that the same inbound two-dimensional code of one mobile device can be used for getting in a station a plurality of times. In this case, a plurality of pieces of inbound information need to be sent to the payment system.

205. When the user gets out of a station, the mobile device generates a second electronic credential based on the user information.

Optionally, the client device of the mobile device can obtain the first electronic credential information from a cached record, and use the first electronic credential information as the second electronic credential information.

Optionally, the client device further sends a credential request that includes the user information to the payment system, and requests the second electronic credential, where the second electronic credential is different from the first electronic credential.

Further, the second electronic credential information includes an inbound identifier. The inbound identifier indicates that the client device has registered with the inbound charging apparatus, and the inbound identifier is used to verify validity of the second electronic credential information. As such, the following case can be avoided: The payment system fails to obtain complete inbound and outbound information because the user uses an electronic credential of an account when getting in a station but uses an electronic credential of another account when getting out of a station, or because the user evades paying a fare when getting in a station. The inbound identifier can be a flag bit or an inbound station identifier such as a name or a number of an inbound station. Implementations are not limited in the present implementation of the present application.

206. The mobile device sends the second electronic credential to the outbound POS machine.

If the first electronic credential is the same as the second electronic credential, the client device of the mobile device can read the two-dimensional code information when the user gets in the station, and show the two-dimensional code to the outbound POS machine.

Certainly, it should be understood that, regardless of whether the first electronic credential is the same as the second electronic credential, the client device of the mobile device can generate a new two-dimensional code based on the electronic credential and show the new two-dimensional code to the outbound POS machine. For an implementation of generating the outbound two-dimensional code by the mobile device, references can be made to the method for generating the inbound two-dimensional code by the mobile device in step 202. Details are omitted here for simplicity in the present implementation of the present application.

207. The outbound POS machine verifies validity of the second electronic credential, and generates outbound information after verifying that the second electronic credential is valid.

A method for verifying the second electronic credential by the outbound POS machine can be similar to a method for verifying the first electronic credential. Particularly, when the second electronic credential needs to include the inbound identifier, the outbound POS machine can further verify whether the second electronic credential is valid based on the inbound identifier.

208. The outbound POS machine sends the outbound information to the payment system.

For an implementation of sending the outbound information by the outbound POS machine to the payment system, references can be made to the method for sending the inbound information by the inbound POS machine to the payment system in step 204. Details are omitted here for simplicity in the present implementation of the present application.

209. The payment system pays a traffic fee based on the inbound information and the outbound information.

The payment system verifies validity of the inbound information and validity of the outbound information based on the inbound information received in step 204 and the outbound information received in step 208, determines a standard deduction amount based on an inbound station in the inbound information and an outbound station in the outbound information when verifying that the information is valid, and then deducts money from the account that corresponds to the electronic credential based on the electronic credential in the inbound information or the outbound information. The standard deduction amount is an amount of money that needs to be deducted between the inbound station and the outbound station in a normal case.

It should be understood that, if the inbound information and the outbound information further include a charging timestamp, the payment system can further determine a time used by the user based on an inbound charging timestamp and an outbound charging timestamp. If there is a timeout limit, the payment system can further determine the timeout deduction amount based on the inbound charging timestamp and the outbound charging timestamp. A timeout limit that corresponds to the inbound station and the outbound station and a timeout deduction amount that corresponds to the timeout limit can be specified, or a timeout limit that corresponds to the number of stations that a vehicle passes through and a timeout deduction amount that corresponds to the timeout limit can be specified. If there is no timeout, the timeout deduction amount is 0.

For example, if there are three stations between an inbound station and an outbound station, and a corresponding riding time is 30 minutes, a fare is increased by RMB 1 for each 20% increase in the time, and the fare is increased by RMB 5 at most. Assume that the inbound charging timestamp is 11:00, the timeout deduction amount is RMB 3 when the outbound charging timestamp is 12:00, and the timeout deduction amount is RMB 5 when the outbound charging timestamp is 13:00, etc.

A total deduction amount can be determined based on the standard deduction amount and the timeout deduction amount.

In addition, the payment system can further calculate a final consumption amount based on a preferential charging policy. For example, in a Beijing's subway system, a fare of each ride is 20% off after an expenditure of a card in each calendar month reaches RMB 100, a fare of each ride is 50% off after the expenditure reaches RMB 150, a fare of each ride is no longer discounted after the accumulated expenditure reaches RMB 400, etc. In addition, the payment system can further determine a consumption subsidy based on a preferential policy of the payment system, etc.

In the present implementation of the present application, the mobile device displays the two-dimensional code to the charging apparatus such as a POS machine when getting in/out of a station, then the charging apparatus sends the inbound/outbound information to the payment system, and the payment system completes deduction, so that the mobile device can be used to complete traffic section fee payment, thereby improving the payment convenience.

Figure 3:
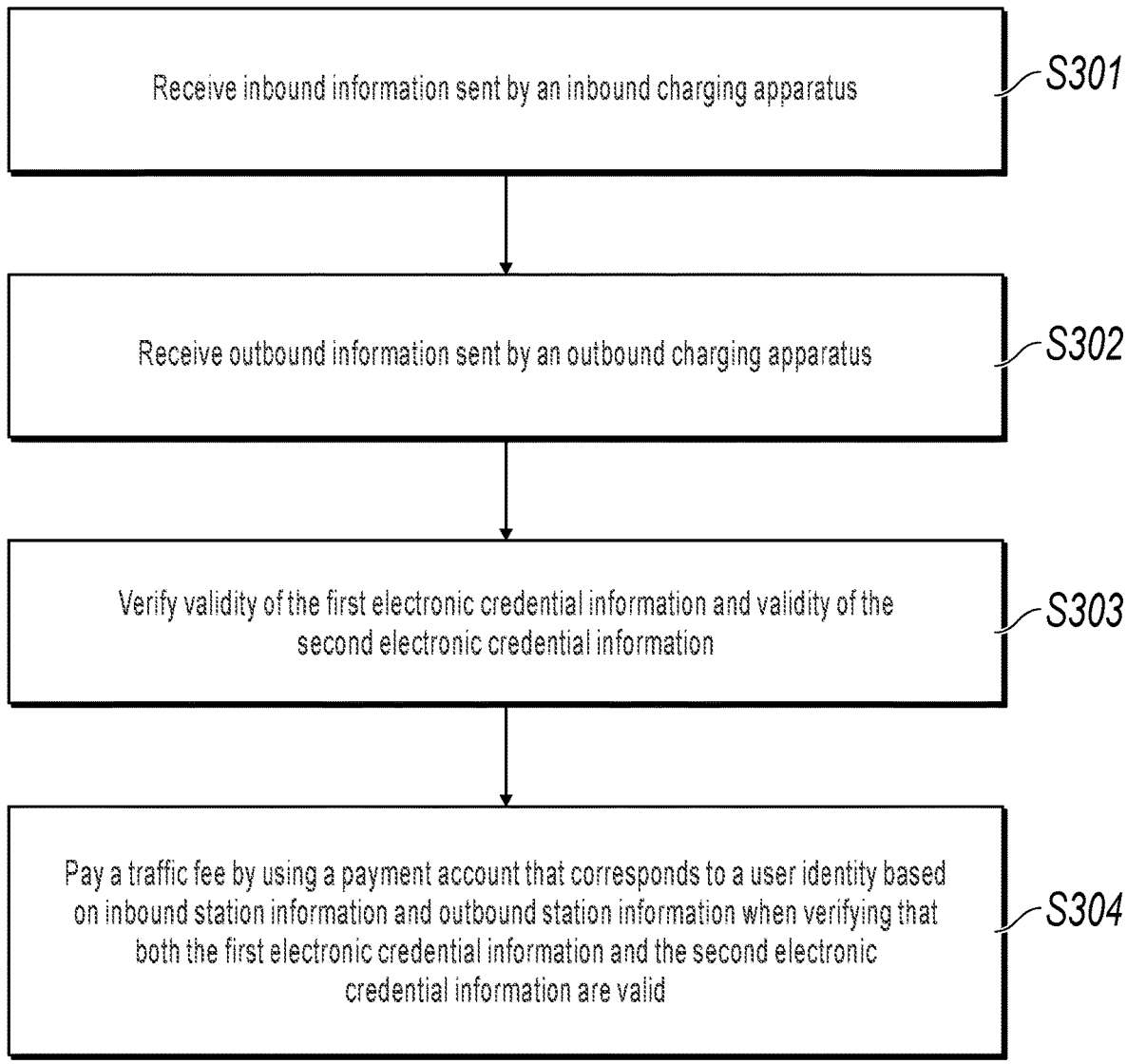
FIG. 3 is a flowchart illustrating a traffic section fee payment method, according to another implementation of the present application.

FIG. 3 is a flowchart illustrating a traffic section fee payment method, according to another implementation of the present application. The method in FIG. 3 is performed by a payment system. The method in FIG. 3 includes the following steps.

S301. Receive inbound information sent by an inbound charging apparatus.

The inbound information includes inbound station information and first electronic credential information, and the first electronic credential information is authentication information generated by the payment system based on a user identity in a client device.

S302. Receive outbound information sent by an outbound charging apparatus.

The outbound information includes outbound station information and second electronic credential information, and the second electronic credential information is authentication information generated by the payment system based on the user identity in the client device.

S303. Verify validity of first electronic credential information and validity of second electronic credential information.

S304. Pay a traffic fee by using a payment account that corresponds to a user identity based on inbound station information and outbound station information when verifying that both the first electronic credential information and the second electronic credential information are valid.

In the present implementation of the present application, the payment system determines the payment account and pays the traffic fee based on the inbound information of the inbound charging apparatus and the outbound information of the outbound charging apparatus, thereby improving the payment convenience.

Optionally, the method can further include the following: sending the first electronic credential information to the client device that corresponds to the user identity based on a first credential request sent by the client device that corresponds to the user identity, where the first electronic credential information is used by the client device to register with the inbound charging apparatus for getting in a station; and sending the second electronic credential information to the client device that corresponds to the user identity based on a second credential request sent by the client device that corresponds to the user identity, where the second electronic credential information is used by the client device to register with the outbound charging apparatus for getting out of a station.

Optionally, the second electronic credential information further includes an inbound identifier. The inbound identifier indicates that the client device has registered with the inbound charging apparatus, and the inbound identifier is used by the outbound charging apparatus to verify the validity of the second electronic credential information.

Optionally, the first electronic credential information further includes a first timestamp, used to indicate a valid time of the first electronic credential. The second electronic credential information further includes a second timestamp, used to indicate a valid time of the second electronic credential.

Optionally, the inbound information further includes an inbound timestamp, and the outbound information further includes an outbound timestamp. The paying a traffic fee by using a payment account that corresponds to a user identity based on inbound station information and outbound station information is implemented as follows: paying the traffic fee by using the payment account that corresponds to the user identity based on the inbound station information, the outbound station information, the inbound timestamp, and the outbound timestamp.

Further, after the inbound information sent by the inbound charging apparatus is received or the outbound information sent by the outbound charging apparatus is received, the method further includes the following: When determining that inbound information or outbound information that an interval between a current time and an inbound timestamp or an outbound timestamp is greater than a predetermined time and that a traffic fee has not been paid exists in the payment account that corresponds to the user identity, the payment system pays the traffic fee by using the payment account that corresponds to the user identity based on a predetermined fare, and modifies, to a paid state, the inbound information or outbound information that a traffic fee has not been paid.

It should be understood that the entire payment procedure is a procedure in a normal case in the implementation shown in FIG. 2. In practice, the following case may occur: The user registers inbound information when getting in a station, or forgets to register outbound information when getting out of a station. The payment system fails to perform charging if there is only inbound information or outbound information. This case is especially common when the user takes a section fee bus. To perform charging in such a scenario, when receiving the inbound information sent by the charging apparatus such as a POS machine, the payment system can query whether there is inbound/outbound information that money is not deducted and that an occurrence time is before a predetermined time. If the payment system determines that there is inbound/outbound information that money is not deducted and that an occurrence time is before a predetermined time, the payment system deducts money from the account that corresponds to the user identity in the client device according to a predetermined rule.

For example, if the payment system receives one piece of inbound/outbound information of account A today and finds that inbound/outbound information of account A that occurred yesterday and that charging was not performed exists in the payment system, the payment system can perform charging on the yesterday's inbound/outbound information of account A based on the highest consumption fare, etc.

For the implementation shown in FIG. 3, references can be made to the method performed by the payment system in the implementation shown in FIG. 2. Details are omitted here for simplicity in the present implementation of the present application.

Figure 4:
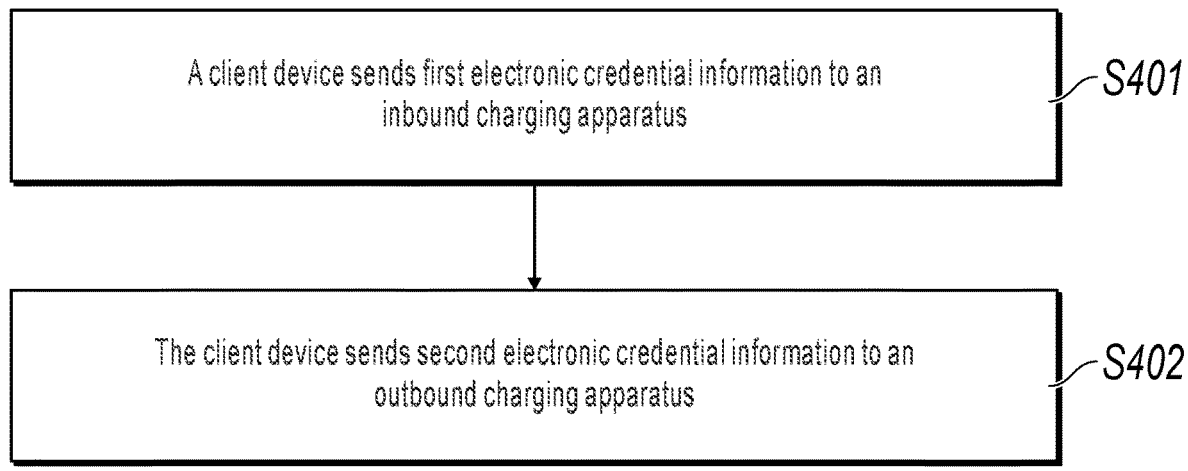
FIG. 4 is a flowchart illustrating a traffic section fee payment method, according to another implementation of the present application.

FIG. 4 is a flowchart illustrating a traffic section fee payment method, according to still another implementation of the present application. The method in FIG. 4 is performed by a client device. The method in FIG. 4 can include the following steps.

S401. The client device sends first electronic credential information to an inbound charging apparatus.

The first electronic credential information is authentication information generated by a payment system based on a user identity in the client device.

402. The client device sends second electronic credential information to an outbound charging apparatus, where the second electronic credential information is authentication information generated by the payment system based on a user identity in the client device.

In the present implementation of the present application, the client device separately sends electronic credentials to the inbound charging apparatus and the outbound charging apparatus when getting in and out of a station, and sends inbound and outbound information that includes inbound and outbound station information and the electronic credentials to the payment system by using the charging apparatuses, so that a traffic fee can be paid in the payment system, thereby improving the payment convenience.

Optionally, before the client device sends the first electronic credential information to the inbound charging apparatus, the method further includes the following: The client device requests the first electronic credential information that corresponds to the user identity from the payment system. Before the client device sends the second electronic credential information to the outbound charging apparatus, the method further includes the following: The client device requests the second electronic credential information that corresponds to the user identity from the payment system.

Optionally, the second electronic credential information further includes an inbound identifier. The inbound identifier indicates that the client device has registered with the inbound charging apparatus, and the inbound identifier is used to verify validity of the second electronic credential information.

Optionally, the first electronic credential information further includes a first timestamp, used to verify the validity of the first electronic credential. The second electronic credential information further includes a second timestamp, used to verify the validity of the second electronic credential.

For the implementation shown in FIG. 4, references can be made to the method performed by the mobile device in the implementation shown in FIG. 2. Details are omitted here for simplicity in the present implementation of the present application.

Figure 5:
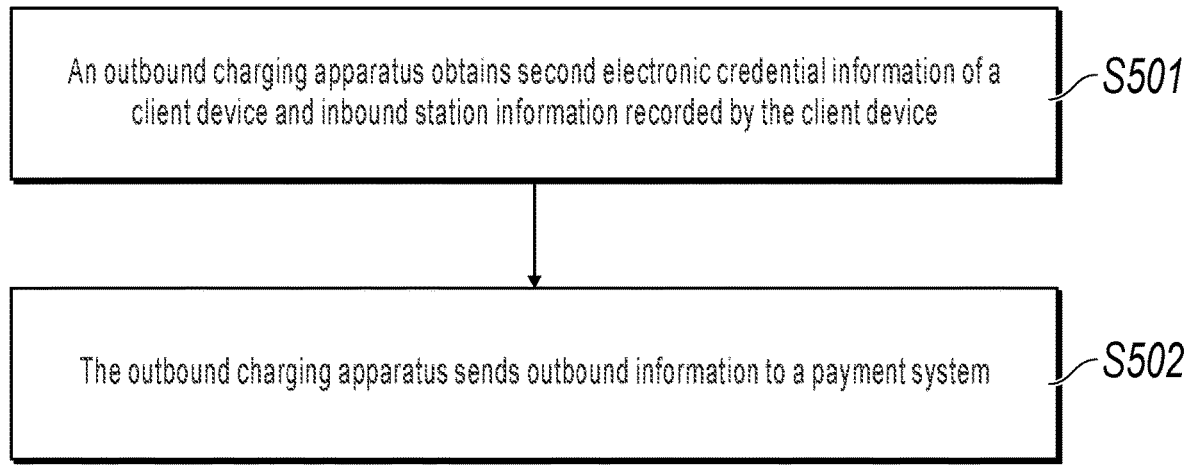
FIG. 5 is a flowchart illustrating a traffic section fee payment method, according to still another implementation of the present application.

FIG. 5 is a flowchart illustrating a traffic section fee payment method, according to an implementation of the present application. The method in FIG. 5 is performed by a fee system. The fee system can include an outbound charging apparatus. In applications, a charging apparatus can be a device that can perform near field communication, or can be a device that can scan and recognize a barcode, etc. Implementations are not limited in the present implementation of the present application. The method in FIG. 5 can include the following steps.

S501. The outbound charging apparatus obtains second electronic credential information of a client device and inbound station information recorded by the client device.

The second electronic credential information is authentication information generated by a payment system based on a user identity in the client device.

S502. The outbound charging apparatus sends outbound information to a payment system.

The outbound information includes outbound station information, the inbound station information, and the second electronic credential information.

The outbound information is used by the payment system to determine a payment account that corresponds to the user identity in the client device and pay a traffic fee.

In the present implementation of the present application, the outbound charging apparatus obtains the electronic credential information of the user's client device, namely, the inbound station information recorded in the client device, generates the outbound information that includes the electronic credential, the inbound station information, and the outbound station information, and sends the outbound information to the payment system, so that the payment system can determine the payment account and pay the traffic fee based on the outbound information, thereby improving the payment convenience.

Optionally, in an implementation, before step S501, the method further includes the following: An inbound charging apparatus obtains first electronic credential information of the client device, where the first electronic credential information is authentication information generated by the payment system based on the user identity in the client device, and the inbound charging apparatus sends inbound information to the payment system, where the inbound information includes the inbound station information and the first electronic credential information.

When a user gets in a station, the inbound charging apparatus can also generate the inbound information and send the inbound information to the payment system, to enhance verification to avoid an error.

Further, the second electronic credential information includes an inbound identifier. The inbound identifier is used to indicate that the payment system has received the inbound information that includes the first electronic credential information, and the inbound identifier is used by the outbound charging apparatus to verify validity of the second electronic credential information.

Optionally, before step S502, the method further includes the following: The outbound charging apparatus verifies the validity of the second electronic credential information. Step S502 is specifically implemented as follows: The outbound charging apparatus sends the outbound information to the payment system when the outbound charging apparatus verifies that the second electronic credential information is valid.

Further, the second electronic credential information includes a second timestamp, used to verify the validity of the second electronic credential.

Optionally, the method further includes the following:

The payment system receives the outbound information sent by the outbound charging apparatus, where the outbound information includes the outbound station information, the inbound station information, and the second electronic credential information, and the second electronic credential information is authentication information generated by the payment system based on the user identity in the client device. The payment system verifies the validity of the second electronic credential information. When the payment system verifies that the second electronic credential information is valid, the payment system pays the traffic fee by using the payment account that corresponds to the user identity based on the inbound station information and the outbound station information.

Optionally, the method further includes the following:

The client device obtains the inbound station information and records the inbound station information, and the client device sends the second electronic credential and the inbound station information to the outbound charging apparatus.

Optionally, the outbound information is used by the payment system to verify the validity of the second electronic credential information and pay the traffic fee by using the payment account that corresponds to the user identity based on the inbound station information and the outbound station information when verifying that the second electronic credential information is valid.

Optionally, the inbound station information of the client device is read and recorded by the client device when the user gets in an inbound station.

The method in the present implementation of the present application is further described below with reference to specific implementations.

Figure 6:
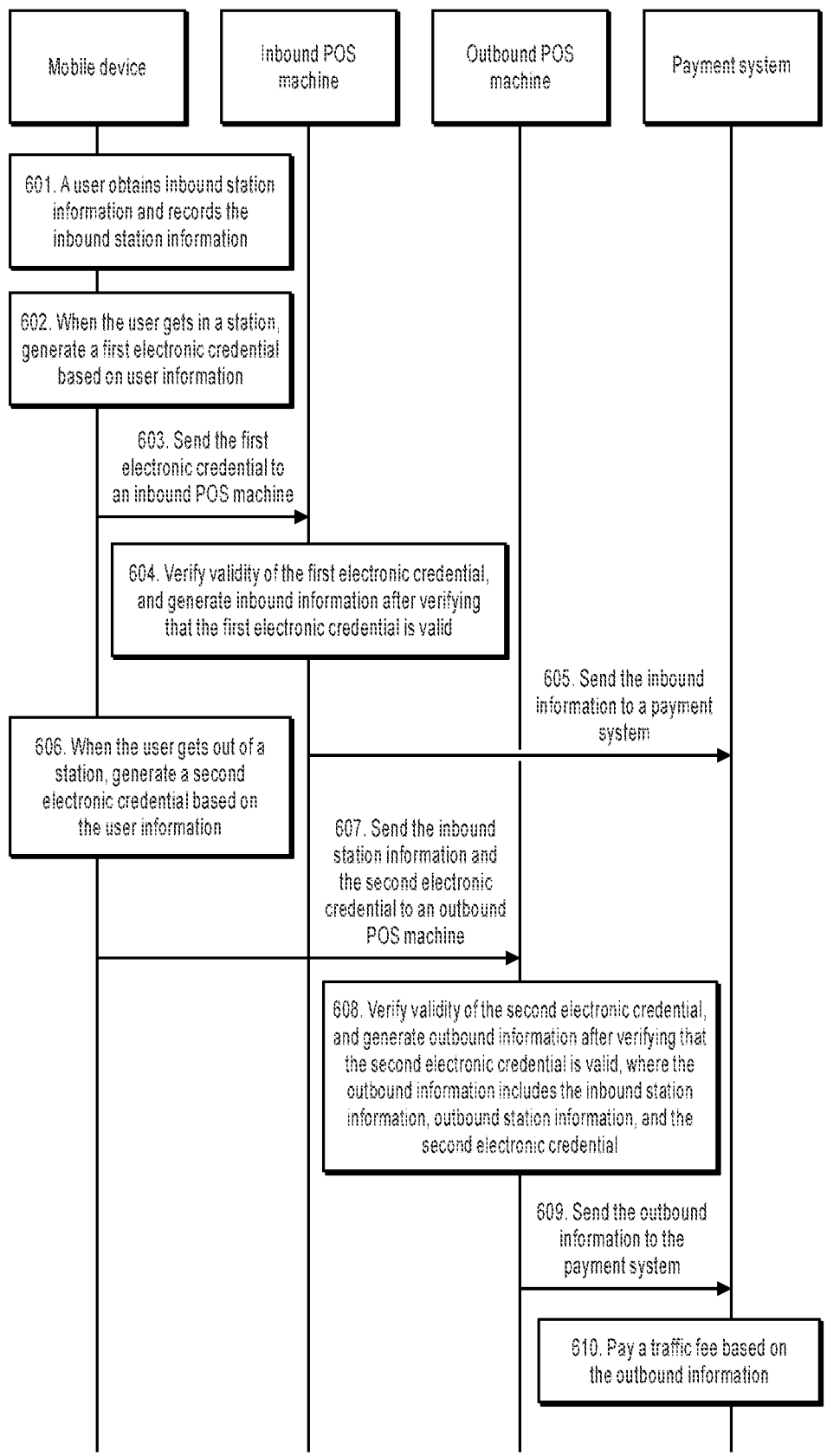
FIG. 6 is a sequence flowchart illustrating a traffic section fee payment method, according to still another implementation of the present application.

FIG. 6 is a sequence flowchart illustrating a traffic section fee payment method, according to an implementation of the present application. In the present implementation of the present application, a mobile device is the client device in the implementation shown in FIG. 5, or the mobile device has a function of the client device in the implementation shown in FIG. 5. An inbound POS machine and an outbound POS machine are the charging apparatuses in the implementation shown in FIG. 5. A payment system is the payment system in the implementation shown in FIG. 5.

601. A user obtains inbound station information and records the inbound station information.

The user can obtain the inbound station information by using a plurality of methods.

Optionally, the inbound POS machine generates a two-dimensional code of an inbound station and displays the two-dimensional code to the user.

In the present implementation of the present application, the inbound POS machine can generate the two-dimensional code of the inbound station and display the two-dimensional code to the user, where the two-dimensional code of the inbound station includes inbound station information. The two-dimensional code of the inbound station can include the inbound station information and a token of a time factor, or can include an electronic credential configured by the payment system for the inbound station.

Certainly, it should be understood that the two-dimensional code of the inbound station can also be generated and displayed dynamically by another device. Alternatively, after the two-dimensional code of the station that the user is to get in is generated, the two-dimensional code can be posted to a place near the inbound POS machine or another place that is easy to be discovered and scanned by the user in the inbound station.

When the mobile device has a camera scanning function, the mobile device can scan the two-dimensional code of the inbound station by using a camera, to extract the inbound station information.

Certainly, it should be understood that the mobile device can further obtain the inbound station information by using another method, for example, by manually entering the inbound station information in an APP or manually selecting the inbound station information.

After obtaining the inbound station information, the user can record and store the inbound station information for use when getting out of a station.

602. When the user gets in a station, generate a first electronic credential based on user information.

For a method for obtaining the electronic credential, references can be made to the method for obtaining the electronic credential in step 201 in FIG. 2. Details are omitted here for simplicity in the present implementation of the present application.

603. The mobile device sends the first electronic credential to the inbound POS machine.

For an implementation of step 603, references can be made to step 202 in the implementation shown in FIG. 2. Details are omitted here for simplicity in the present implementation of the present disclosure.

604. The inbound POS machine verifies validity of the first electronic credential, and generates inbound information after verifying that the first electronic credential is valid.

For an implementation of step 604, references can be made to step 203 in the implementation shown in FIG. 2.

605. The inbound POS machine sends the inbound information to the payment system.

For an implementation of step 605, references can be made to step 204 in the implementation shown in FIG. 2.

Certainly, it should be understood that generating the inbound information and sending the inbound information to the payment system are optional in the present implementation of the present application. The inbound POS machine may not generate the inbound information, or may not send the inbound information.

606. When the user gets out of a station, the mobile device generates a second electronic credential based on the user information.

For an implementation of step 606, references can be made to step 205 in the implementation shown in FIG. 2. Details are omitted here for simplicity in the present implementation of the present disclosure.

It should be understood that the second electronic credential information further includes an inbound identifier. The inbound identifier indicates that the client device has registered with the inbound charging apparatus, and the inbound identifier is used to verify validity of the second electronic credential information. As such, the following case can be avoided: The payment system fails to obtain complete inbound and outbound information because the user uses an electronic credential of an account when getting in a station but uses an electronic credential of another account when getting out of a station, or because the user evades paying a fare when getting in a station. The inbound identifier can be a flag bit or an inbound station identifier such as a name or a number of an inbound station. Implementations are not limited in the present implementation of the present application.

607. The mobile device sends the inbound station information and the second electronic credential.

A two-dimensional code is used as an example. The mobile device can generate a two-dimensional code based on the inbound station information and the second electronic credential, and show the two-dimensional code to the outbound POS machine.

For an implementation of showing the outbound two-dimensional code by the mobile device, references can be made to the method for showing the inbound two-dimensional code by the mobile device in step 202. Details are omitted here for simplicity in the present implementation of the present application.

608. The outbound POS machine verifies validity of the second electronic credential, and generates outbound information after verifying that the second electronic credential is valid, where the outbound information includes the inbound station information, outbound station information, and the second electronic credential.

For a method for verifying the validity of the second electronic credential by the outbound POS machine, references can be made to step 203.

After verifying that the second electronic credential is valid, the outbound information can be generated based on the inbound station information, the outbound station information, and the second electronic credential. In addition to the outbound station information and the outbound electronic credential, the outbound information further includes the inbound station information, or further includes the inbound station information and deduction amount information.

609. The outbound POS machine sends the outbound information to the payment system.

For an implementation of sending the outbound information by the outbound POS machine to the payment system, references can be made to the method for sending the inbound information by the inbound POS machine to the payment system in step 204. Details are omitted here for simplicity in the present implementation of the present application.

610. The payment system pays a traffic fee based on the outbound information.

The payment system pays the traffic fee based on the outbound information.

If the outbound information includes the outbound station information, the inbound station information, and the outbound electronic credential, the payment system can verify the user information based on the outbound electronic credential, and obtain an account number that corresponds to the electronic credential in the payment system. In addition, the payment system can further determine a deduction amount and deduct money based on the outbound station information and the inbound station information.

If the outbound information includes the outbound station information, the inbound station information, a deduction amount, and the outbound electronic credential, the payment system can verify the user information based on the outbound electronic credential, and obtain an account number that corresponds to the electronic credential in the payment system. In addition, the payment system directly deducts money based on the deduction amount in the outbound information.

Figure 7:
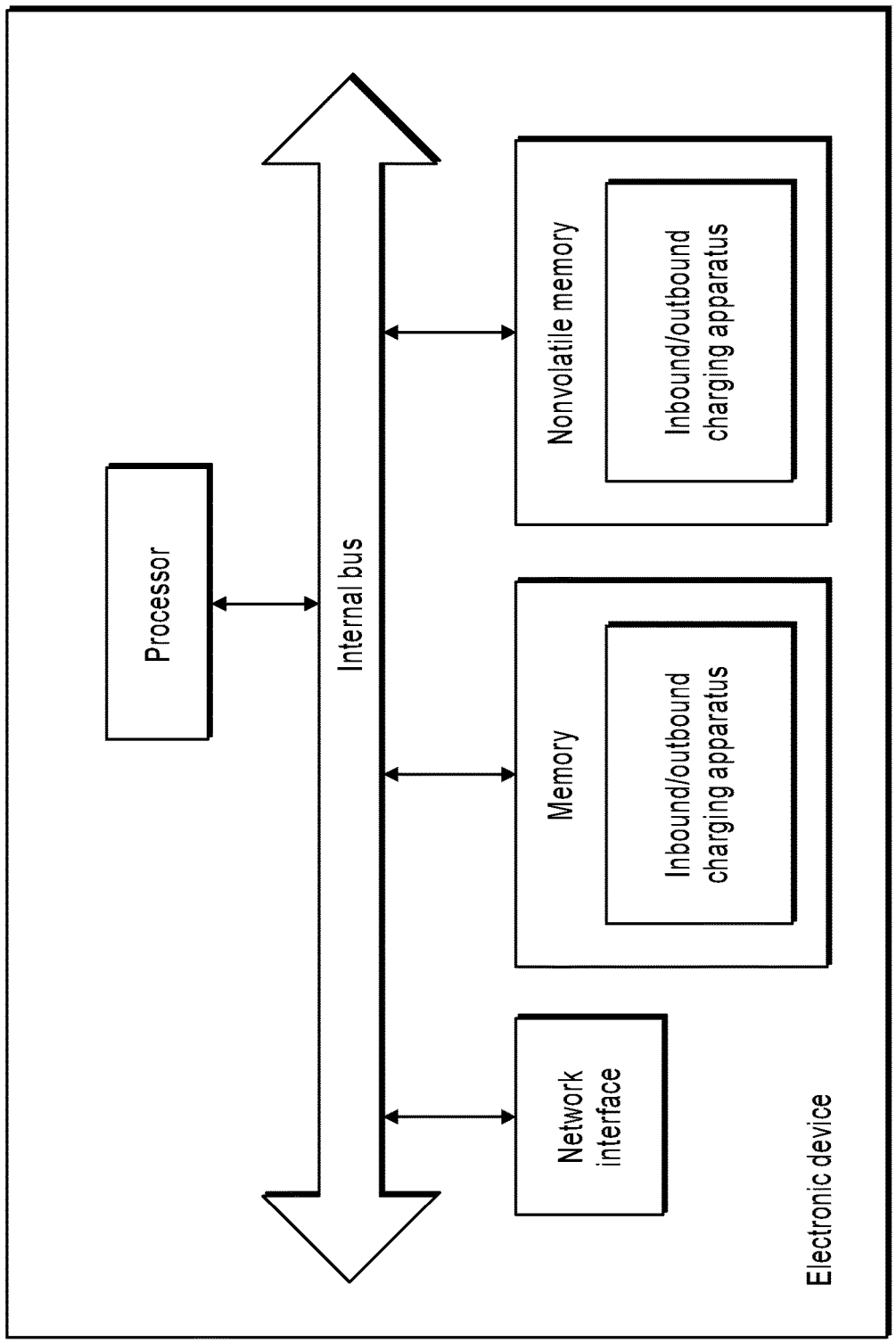
FIG. 7 is a schematic structural diagram illustrating an electronic device, according to an implementation of the present application.

FIG. 7 is a schematic structural diagram illustrating an electronic device, according to an implementation of the present application. As shown in FIG. 7, in terms of hardware, the electronic device includes a processor, an internal bus, a network interface, a memory, and a nonvolatile memory, and certainly can further include hardware needed by other services. The processor reads a corresponding computer program from the nonvolatile memory to the memory for running, and an inbound/outbound charging apparatus is logically formed. Certainly, in addition to a software implementation, the present application does not exclude another implementation, for example, a logic device or a combination of hardware and software. In other words, an execution body of the following processing procedure is not limited to each logical unit, and can also be hardware or a logic device.

Figure 8:
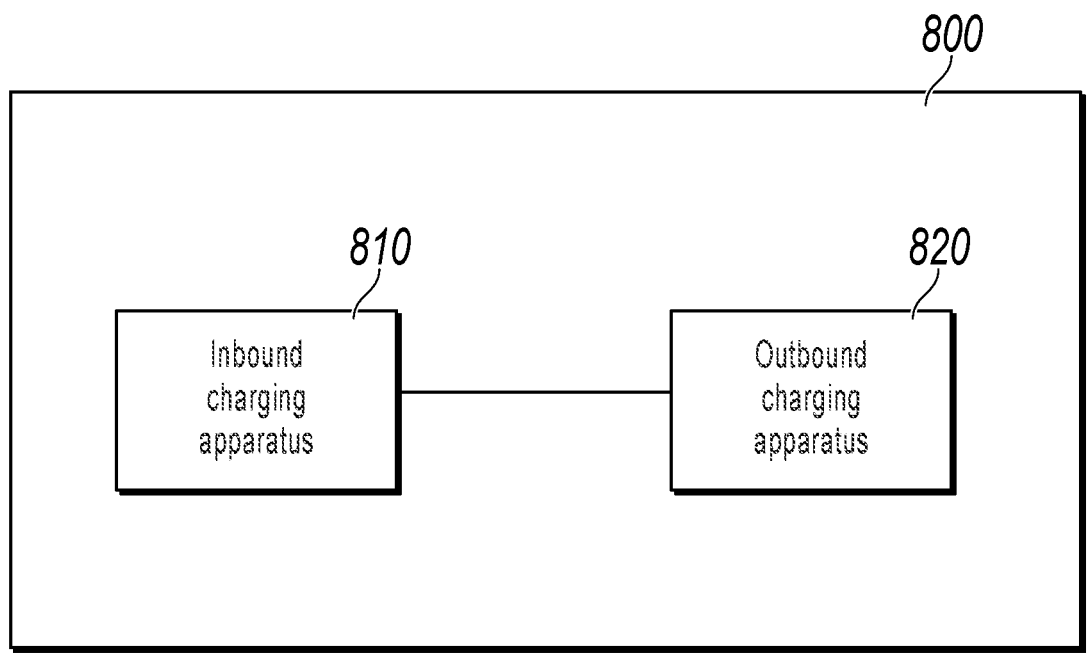
FIG. 8 is a schematic structural diagram illustrating a fee system, according to an implementation of the present application.

FIG. 8 is a schematic structural diagram illustrating a fee system 800, according to an implementation of the present application. Referring to FIG. 8, in a software implementation, the fee system 800 can include an inbound charging apparatus 810 and an outbound charging apparatus 820.

The inbound charging apparatus 810 can obtain first electronic credential information of a client device, where the first electronic credential information is authentication information generated by a payment system based on a user identity in the client device.

The inbound charging apparatus 810 can send inbound information to the payment system, where the inbound information includes inbound station information and the first electronic credential information.

The outbound charging apparatus 820 can obtain second electronic credential information of the client device, where the second electronic credential information is authentication information generated by the payment system based on the user identity in the client device.

The outbound charging apparatus 820 can send outbound information to the payment system, where the outbound information includes outbound station information and the second electronic credential information.

The outbound information and the inbound information are used by the payment system to determine a payment account that corresponds to the user identity in the client device and pay a traffic fee.

Optionally, in an implementation, the inbound charging apparatus 810 can verify validity of the first electronic credential information.

That the inbound charging apparatus 810 sends inbound information to the payment system includes the following: The inbound charging apparatus 810 sends the inbound information to the payment system when the inbound charging apparatus 810 verifies that the first electronic credential information is valid.

The outbound charging apparatus 820 can further verify validity of the second electronic credential information.

That the outbound charging apparatus 820 sends outbound information to the payment system includes the following: The outbound charging apparatus 820 sends the outbound information to the payment system when the outbound charging apparatus 820 verifies that the second electronic credential information is valid.

Further, the second electronic credential information includes an inbound identifier. The inbound identifier indicates that the client device has registered with the inbound charging apparatus, and the inbound identifier is used to verify the validity of the second electronic credential information.

Optionally, the first electronic credential information further includes a first timestamp, used to verify the validity of the first electronic credential. The second electronic credential information further includes a second timestamp, used to verify the validity of the second electronic credential.

Optionally, the inbound charging apparatus 810 can further obtain the first electronic credential information by using first barcode information displayed by the client device, where the first barcode information includes the first electronic credential information. The outbound charging apparatus 820 obtains the second electronic credential information by using second barcode information displayed by the client device, where the second barcode information includes the second electronic credential information.

Further, the first barcode information includes the inbound station information, used to verify validity of the first barcode information, and/or the second barcode information further includes the outbound station information, used to verify validity of the second barcode information.

Optionally, the inbound charging apparatus 810 and the outbound charging apparatus 820 are the same apparatus. For example, when the inbound charging apparatus 810 and the outbound charging apparatus 820 in the present implementation of the present application are applied to a bus, the inbound charging apparatus 810 and the outbound charging apparatus 820 can be the same apparatus, which is responsible for both inbound charging and outbound charging.

Figure 9:
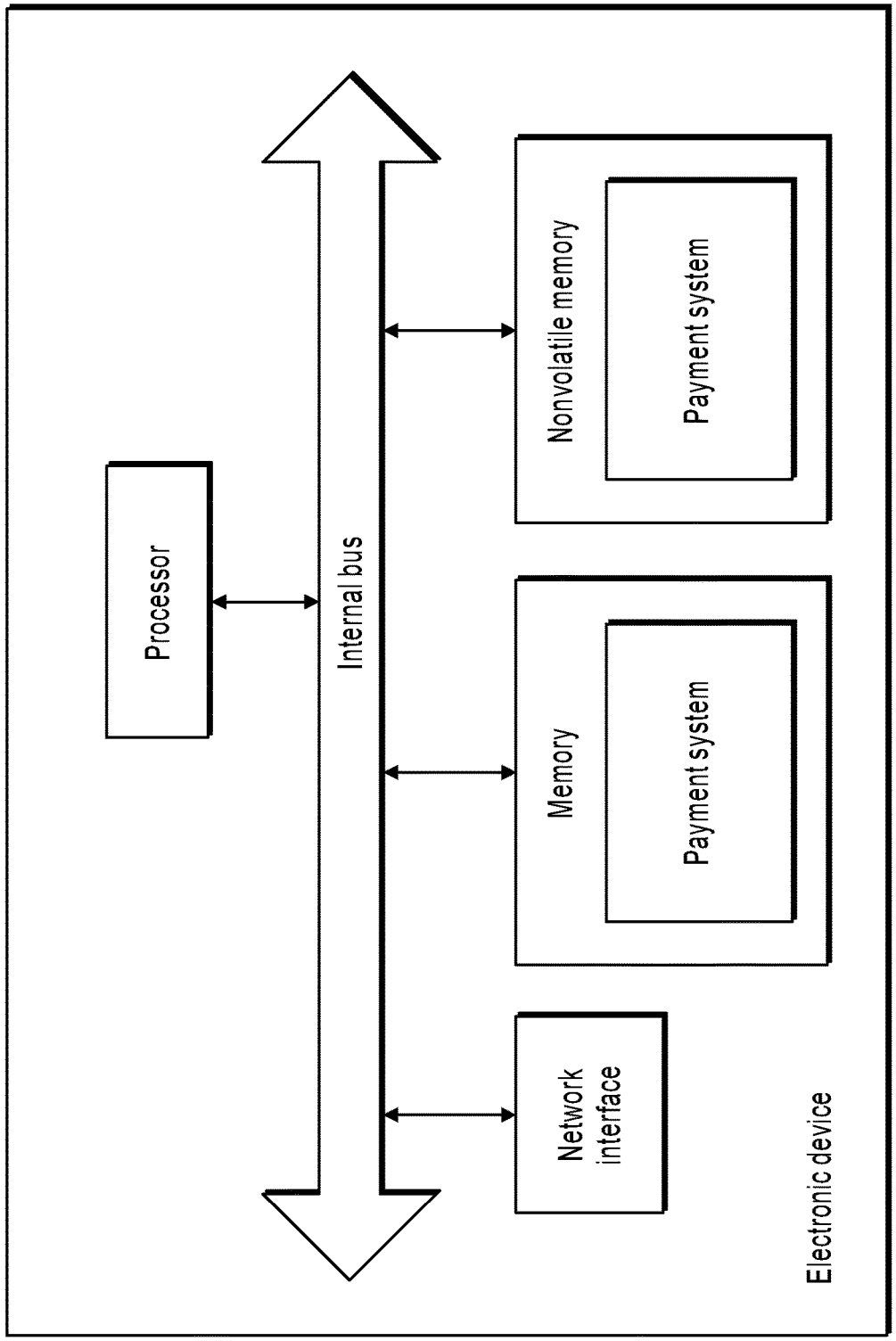
FIG. 9 is a schematic structural diagram illustrating an electronic device, according to an implementation of the present application.

FIG. 9 is a schematic structural diagram illustrating an electronic device, according to an implementation of the present application. As shown in FIG. 9, in terms of hardware, the electronic device includes a processor, an internal bus, a network interface, a memory, and a nonvolatile memory, and certainly can further include hardware needed by other services. The processor reads a corresponding computer program from the nonvolatile memory to the memory for running, and a payment system is logically formed. Certainly, in addition to a software implementation, the present application does not exclude another implementation, for example, a logic device or a combination of hardware and software. In other words, an execution body of the following processing procedure is not limited to each logical unit, and can also be hardware or a logic device.

Figure 10:
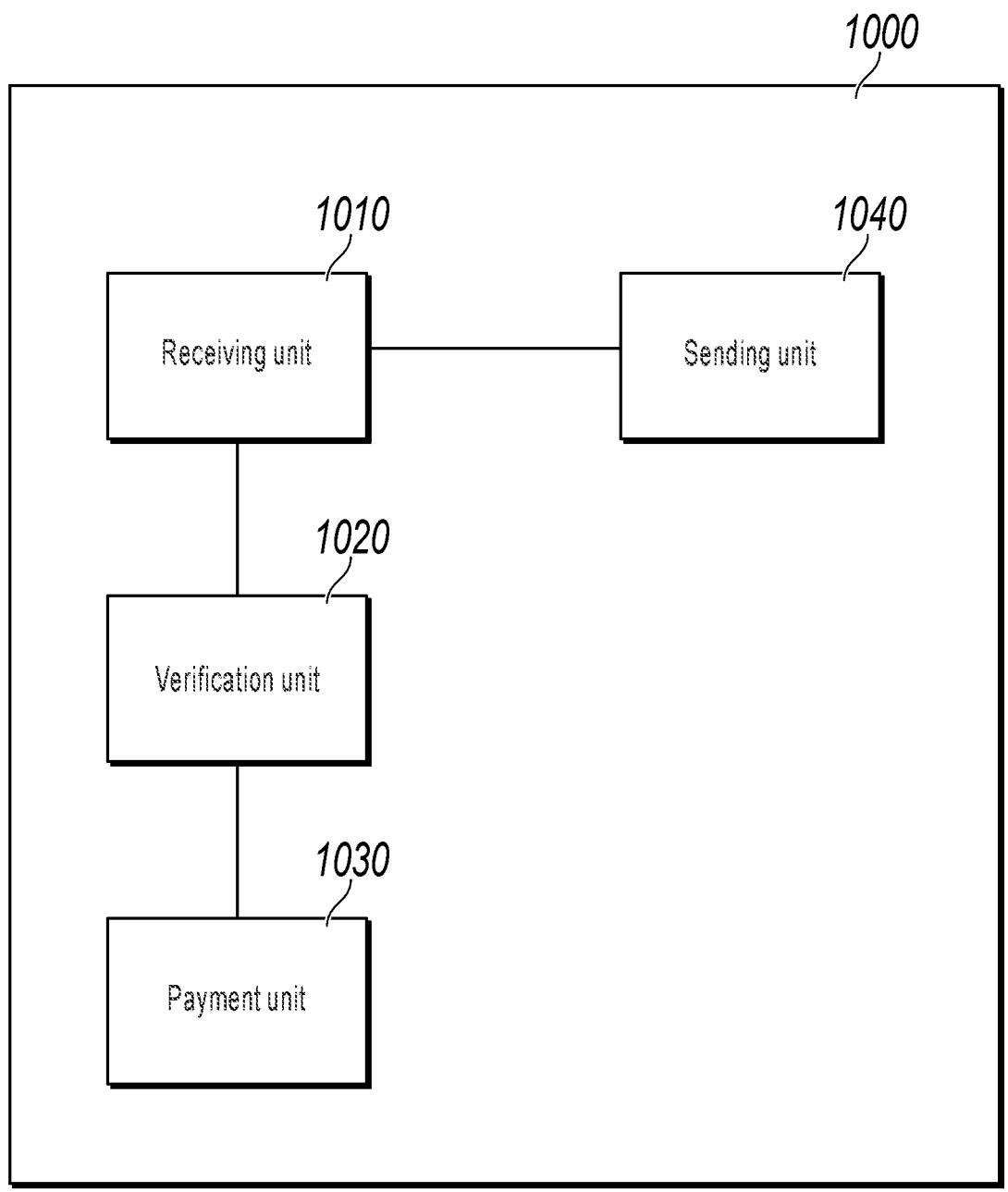
FIG. 10 is a schematic structural diagram illustrating a payment system, according to an implementation of the present application.

FIG. 10 is a schematic structural diagram illustrating a payment system 1000, according to an implementation of the present application. Referring to FIG. 10, in a software implementation, the payment system 1000 can include the following: a receiving unit 1010, configured to receive inbound information sent by an inbound charging apparatus, where the inbound information includes inbound station information and first electronic credential information, and the first electronic credential information is authentication information generated by the payment system based on a user identity in a client device, where the receiving unit 1010 is further configured to receive outbound information sent by an outbound charging apparatus, where the outbound information includes outbound station information and second electronic credential information, and the second electronic credential information is authentication information generated by the payment system based on the user identity in the client device; a verification unit 1020, configured to verify validity of the first electronic credential information and validity of the second electronic credential information; and a payment unit 1030, configured to pay a traffic fee by using a payment account that corresponds to the user identity based on the inbound station information and the outbound station information when the verification unit verifies that both the first electronic credential information and the second electronic credential information are valid.

Optionally, in an implementation, the payment system 1000 further includes a sending unit 1040.

The sending unit 1040 is configured to send the first electronic credential information to the client device that corresponds to the user identity based on a first credential request sent by the client device that corresponds to the user identity, where the first electronic credential information is used by the client device to register with the inbound charging apparatus for getting in a station.

The sending unit 1040 is further configured to send the second electronic credential information to the client device that corresponds to the user identity based on a second credential request sent by the client device that corresponds to the user identity, where the second electronic credential information is used by the client device to register with the outbound charging apparatus for getting out of a station.

Further, the second electronic credential information includes an inbound identifier. The inbound identifier indicates that the client device has registered with the inbound charging apparatus, and the inbound identifier is used by the outbound charging apparatus to verify the validity of the second electronic credential information.

Optionally, the first electronic credential information further includes a first timestamp, used to indicate a valid time of the first electronic credential. The second electronic credential information further includes a second timestamp, used to indicate a valid time of the second electronic credential.

Optionally, the inbound information further includes an inbound timestamp, and the outbound information further includes an outbound timestamp. The payment unit is configured to pay the traffic fee by using the payment account that corresponds to the user identity based on the inbound station information, the outbound station information, the inbound timestamp, and the outbound timestamp.

Further, after the inbound information sent by the inbound charging apparatus is received or the outbound information sent by the outbound charging apparatus is received, when the payment system determines that inbound information or outbound information that an interval between a current time and an inbound timestamp or an outbound timestamp is greater than a predetermined time and that a traffic fee has not been paid exists in the payment account that corresponds to the user identity, the payment unit 1030 is configured to pay the traffic fee by using the payment account that corresponds to the user identity based on a predetermined fare, and modify, to a paid state, the inbound information or outbound information that a traffic fee has not been paid.

The payment system 1000 can further perform the method in FIG. 3, and implement a function of the payment system in the implementation shown in FIG. 2. For an implementation, references can be made to the implementations shown in FIG. 2 and FIG. 3.

Figure 11:
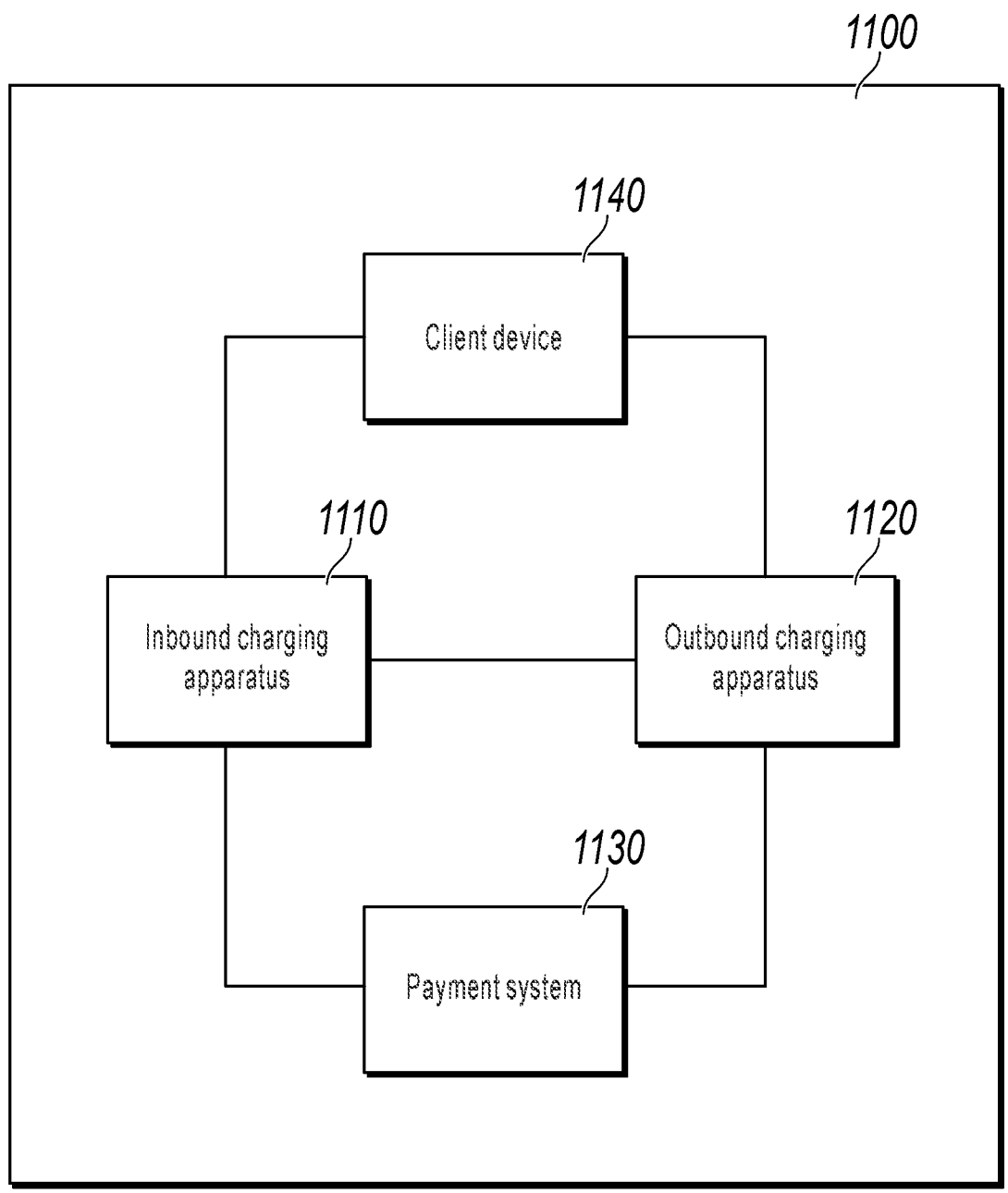
FIG. 11 is a schematic structural diagram illustrating a fee system, according to another implementation of the present application.

FIG. 11 is a schematic structural diagram illustrating a fee system 1100, according to another implementation of the present application.

The fee system 1100 can include an outbound charging apparatus 1120.

The outbound charging apparatus 1120 is configured to obtain second electronic credential information of a client device and inbound station information recorded by the client device, where the second electronic credential information is authentication information generated by a payment system based on a user identity in the client device.

The outbound charging apparatus 1120 is configured to send outbound information to the payment system, where the outbound information includes outbound station information, the inbound station information, and the second electronic credential information.

The outbound information is used by the payment system to determine a payment account that corresponds to the user identity in the client device and pay a traffic fee.

Optionally, the fee system 1100 further includes an inbound charging apparatus 1110.

The inbound charging apparatus 1110 is configured to obtain first electronic credential information of a client device, where the first electronic credential information is authentication information generated by the payment system based on the user identity in the client device.

The inbound charging apparatus 1110 is configured to send inbound information to the payment system, where the inbound information includes the inbound station information and the first electronic credential information.

Further, the second electronic credential information includes an inbound identifier. The inbound identifier is used to indicate that the payment system has received the inbound information that includes the first electronic credential information, and the inbound identifier is used by the outbound charging apparatus 1120 to verify validity of the second electronic credential information.

Optionally, the outbound charging apparatus 1120 is further configured to verify the validity of the second electronic credential information. The outbound charging apparatus 1120 is configured to send the outbound information to the payment system when verifying that the second electronic credential information is valid.

Further, the second electronic credential information includes a second timestamp, used to verify the validity of the second electronic credential.

Optionally, the fee system 1100 further includes the payment system 1130.

The payment system 1130 is configured to receive the outbound information sent by the outbound charging apparatus, where the outbound information includes the outbound station information, the inbound station information, and the second electronic credential information, and the second electronic credential information is authentication information generated by the payment system based on the user identity in the client device. The payment system 1130 is configured to verify validity of the second electronic credential information. The payment system 1130 is configured to pay the traffic fee by using the payment account that corresponds to the user identity based on the inbound station information and the outbound station information when the payment system 1130 verifies that the second electronic credential information is valid.

Optionally, the fee system 1100 further includes the client device 1140.

The client device 1140 is configured to obtain the inbound station information and record the inbound station information. The client device 1140 is configured to send the second electronic credential and the inbound station information to the outbound charging apparatus 1120.

For an implementation of the fee system 1100, references can be made to the methods in the implementations shown in FIG. 5 and FIG. 6. Details are omitted here for simplicity.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and manufacture an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the apparatus above is described by dividing functions into various units. Certainly, when the present application is implemented, the functions of the units can be implemented in one or more pieces of software and/or hardware.

A person skilled in the art should understand that an implementation of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product according to the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, a built-in processor, or a processor of another programmable data processing device to generate a machine, so that the instructions executed by the computer or the processor of the another programmable data processing device generate a device for implementing a specified function in one or more processes in the flowcharts and/or in one or more blocks in the block diagrams.

These computer program instructions can be stored in a computer readable memory that can instruct the computer or the another programmable data processing device to work in a certain way, so that the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or the another programmable data processing device, so that a series of operations and operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For the same or similar parts of the implementations, references can be made to the implementations. Each implementation focuses on a difference from other implementations. Particularly, a system implementation is basically similar to a method implementation, and therefore is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method for traffic section fee payment, comprising:
    obtaining, by a client device, inbound station information;
    recording, by the client device, the inbound station information;
    generating, by the client device and based on first electronic credential information and an inbound timestamp, an inbound barcode, wherein the first electronic credential information comprises a code randomly generated by a payment system, wherein the code comprises a user identity stored by the client device, and wherein the inbound timestamp is added to the inbound barcode and limits validity of the inbound barcode to a predetermined period of time;
    displaying, by the client device, the inbound barcode to an inbound charging apparatus, wherein the inbound charging apparatus generates, based on the inbound barcode, inbound information; and
    sending, by the client device, second electronic credential information and the inbound station information to an outbound charging apparatus, wherein the second electronic credential information comprises authentication information generated by the payment system, wherein the authentication information comprises the user identity, wherein the second electronic credential information is different from the first electronic credential information, wherein the outbound charging apparatus generates, based on the second electronic credential information, outbound information, and wherein the payment system pays, based on the inbound information and the outbound information, a traffic fee by using a payment account that corresponds to at least one of the first electronic credential information or the second electronic credential information.

2. The computer-implemented method of claim 1, further comprising:
    before generating, the inbound barcode:
        requesting, by the client device, the first electronic credential information that corresponds to the user identity from the payment system; and
    before sending, by the client device, the second electronic credential information:
        requesting, by the client device, the second electronic credential information that corresponds to the user identity from the payment system.

3. The computer-implemented method of claim 1, further comprising:
    verifying, by the inbound charging apparatus, validity of the first electronic credential information; and
    sending, by the inbound charging apparatus, the inbound information to the payment system, wherein the inbound information comprises the inbound station information and the first electronic credential information.

4. The computer-implemented method of claim 3, wherein the second electronic credential information further comprises an inbound identifier, wherein the inbound identifier indicates that the client device has registered with the inbound charging apparatus, and wherein the inbound identifier is used to verify validity of the second electronic credential information.

5. The computer-implemented method of claim 4, further comprising:
    obtaining, by the outbound charging apparatus, the second electronic credential information of the client device and the inbound station information recorded by the client device, wherein the inbound identifier is used to indicate that the payment system has received the inbound information that comprises the first electronic credential information.

6. The computer-implemented method of claim 5, further comprising:
    verifying, by the outbound charging apparatus, validity of the second electronic credential information; and sending, by the outbound charging apparatus, the outbound information to the payment system, wherein the outbound information comprises outbound station information, the inbound station information, and the second electronic credential information.

7. The computer-implemented method of claim 6, further comprising:
receiving, by the payment system, the outbound information sent by the outbound charging apparatus;
verifying, by the payment system, validity of the second electronic credential information; and
in response to verification of the second electronic credential information as valid:
paying, by the payment system, the traffic fee by using the payment account that corresponds to the user identity based on the inbound station information and the outbound station information.

8. A non-transitory, computer-readable medium storing one or more instructions executable by a computer system to perform operations comprising:
obtaining, by a client device, inbound station information;
recording, by the client device, the inbound station information;
generating, by the client device and based on first electronic credential information and an inbound timestamp, an inbound barcode, wherein the first electronic credential information comprises a code randomly generated by a payment system, wherein the code comprises a user identity stored by the client device, and wherein the inbound timestamp is added to the inbound barcode and limits validity of the inbound barcode to a predetermined period of time;
displaying, by the client device, the inbound barcode to an inbound charging apparatus, wherein the inbound charging apparatus generates, based on the inbound barcode, inbound information; and
sending, by the client device, second electronic credential information and the inbound station information to an outbound charging apparatus, wherein the second electronic credential information comprises authentication information generated by the payment system, wherein the authentication information comprises the user identity, wherein the second electronic credential information is different from the first electronic credential information, wherein the outbound charging apparatus generates, based on the second electronic credential information, outbound information, and wherein the payment system pays, based on the inbound information and the outbound information, a traffic fee by using a payment account that corresponds to at least one of the first electronic credential information or the second electronic credential information.

9. The non-transitory, computer-readable medium of claim 8, further comprising:
before generating the inbound barcode:
requesting, by the client device, the first electronic credential information that corresponds to the user identity from the payment system; and
before sending, by the client device, the second electronic credential information:
requesting, by the client device, the second electronic credential information that corresponds to the user identity from the payment system.

10. The non-transitory, computer-readable medium of claim 8, further comprising:
verifying, by the inbound charging apparatus, validity of the first electronic credential information; and
sending, by the inbound charging apparatus, the inbound information to the payment system, wherein the inbound information comprises the inbound station information and the first electronic credential information.

11. The non-transitory, computer-readable medium of claim 10, wherein the second electronic credential information further comprises an inbound identifier, wherein the inbound identifier indicates that the client device has registered with the inbound charging apparatus, and wherein the inbound identifier is used to verify validity of the second electronic credential information.

12. The non-transitory, computer-readable medium of claim 11, further comprising:
obtaining, by the outbound charging apparatus, the second electronic credential information of the client device and the inbound station information recorded by the client device, wherein the inbound identifier is used to indicate that the payment system has received the inbound information that comprises the first electronic credential information.

13. The non-transitory, computer-readable medium of claim 12, further comprising:
verifying, by the outbound charging apparatus, validity of the second electronic credential information; and
sending, by the outbound charging apparatus, the outbound information to the payment system, wherein the outbound information comprises outbound station information, the inbound station information, and the second electronic credential information.

14. The non-transitory, computer-readable medium of claim 13, further comprising:
receiving, by the payment system, the outbound information sent by the outbound charging apparatus;
verifying, by the payment system, validity of the second electronic credential information; and
in response to verification of the second electronic credential information as valid:
paying, by the payment system, the traffic fee by using the payment account that corresponds to the user identity based on the inbound station information and the outbound station information.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a client device, inbound station information;
recording, by the client device, the inbound station information;
generating, by the client device and based on first electronic credential information and an inbound timestamp, an inbound barcode, wherein the first electronic credential information comprises a code randomly generated by a payment system, wherein the code comprises a user identity stored by the client device, and wherein the inbound timestamp is added to the inbound barcode and limits validity of the inbound barcode to a predetermined period of time;
displaying, by the client device, the inbound barcode to an inbound charging apparatus, wherein the inbound charging apparatus generates, based on the inbound barcode, inbound information; and sending, by the client device, second electronic credential information and the inbound station information to an outbound charging apparatus, wherein the second electronic credential information comprises authentication information generated by the payment system, wherein the authentication information comprises the user identity, wherein the second electronic credential information is different from the first electronic credential information, wherein the outbound charging apparatus generates, based on the second electronic credential information, outbound information, and wherein the payment system pays, based on the inbound information and the outbound information, a traffic fee by using a payment account that corresponds to at least one of the first electronic credential information or the second electronic credential information.

16. The computer-implemented system of claim 15, further comprising:

before sending, by the client device, the second electronic credential information:

requesting, by the client device, the first electronic credential information that corresponds to the user identity from the payment system; and before sending, by the client device, the second electronic credential information:

requesting, by the client device, the second electronic credential information that corresponds to the user identity from the payment system.

17. The computer-implemented system of claim 15, further comprising:

verifying, by the inbound charging apparatus, validity of the first electronic credential information; and sending, by the inbound charging apparatus, the inbound information to the payment system, wherein the inbound information comprises the inbound station information and the first electronic credential information.

18. The computer-implemented system of claim 17, wherein the second electronic credential information further comprises an inbound identifier, wherein the inbound identifier indicates that the client device has registered with the inbound charging apparatus, and wherein the inbound identifier is used to verify validity of the second electronic credential information.

19. The computer-implemented system of claim 18, further comprising:

obtaining, by the outbound charging apparatus, the second electronic credential information of the client device and the inbound station information recorded by the client device, wherein the inbound identifier is used to indicate that the payment system has received the inbound information that comprises the first electronic credential information.

20. The computer-implemented system of claim 19, further comprising:

verifying, by the outbound charging apparatus, validity of the second electronic credential information; and sending, by the outbound charging apparatus, the outbound information to the payment system, wherein the outbound information comprises outbound station information, the inbound station information, and the second electronic credential information.

21. The computer-implemented system of claim 20, further comprising:

receiving, by the payment system, the outbound information sent by the outbound charging apparatus;

verifying, by the payment system, validity of the second electronic credential information; and in response to verification of the second electronic credential information as valid:

paying, by the payment system, the traffic fee by using the payment account that corresponds to the user identity based on the inbound station information and the outbound station information.

* * * * *

UNITED STATES PATENT AND TRADEMARK OFFICE
CERTIFICATE OF CORRECTION

Page 1 of 1

PATENT NO. : 10,977,758 B2
APPLICATION NO. : 16/563294
DATED : April 13, 2021
INVENTOR(S) : Lingnan Shen et al.

It is certified that error appears in the above-identified patent and that said Letters Patent is hereby corrected as shown below:

In the Claims

Column 26, Line 30, in Claim 2, delete "generating," and insert -- generating --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*